United States Patent
Huang et al.

(10) Patent No.: US 9,134,407 B2
(45) Date of Patent: Sep. 15, 2015

(54) MOTION PARAMETER ESTIMATING METHOD, ANGLE ESTIMATING METHOD AND DETERMINATION METHOD

(71) Applicant: National Chiao Tung University, Hsinchu (TW)

(72) Inventors: Chung-Jung Huang, Hsinchu (TW); Chia-Wei Dai, Hsinchu (TW); Tsung-Yu Tsai, Hsinchu (TW); Ta-Sung Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 286 days.

(21) Appl. No.: 13/678,560

(22) Filed: Nov. 16, 2012

(65) Prior Publication Data

US 2014/0028490 A1    Jan. 30, 2014

(30) Foreign Application Priority Data

Jul. 30, 2012   (TW) .............................. 101127474 A (51) Int. Cl.
*G01S 13/58* (2006.01)
*G01S 13/34* (2006.01)
(Continued)

(52) U.S. Cl.
CPC .............. *G01S 13/58* (2013.01); *G01S 13/345* (2013.01); *G01S 13/42* (2013.01); *G01S 13/584* (2013.01); *G01S 13/931* (2013.01); *G01S 2013/9321* (2013.01); *G01S 2013/9375* (2013.01)

(58) Field of Classification Search
CPC ....... G01S 13/345; G01S 13/42; G01S 13/58; G01S 13/584; G01S 13/931; G01S 2013/9321; G01S 2013/9375

USPC .......................................................... 342/107
See application file for complete search history.

(56) References Cited

U.S. PATENT DOCUMENTS 5,274,380 A   12/1993 Yatsuka et al.
5,751,240 A    5/1998 Fujita et al.
(Continued)

FOREIGN PATENT DOCUMENTS

CN           1392957          1/2003

OTHER PUBLICATIONS

J.-H. Choi et al., "High angular resolution estimation methods for vehicle FMCW radar", In Proceeding of IEEE International Conference on Radar, 2011, pp. 1868-1871.
(Continued)

*Primary Examiner* — Timothy A Brainard
(74) *Attorney, Agent, or Firm* — Jianq Chyun IP Office (57) ABSTRACT

A motion parameter estimating method, an angle estimating method and a determination method are provided. The methods are adapted for an electronic device. In the angle estimating method, a first frequency modulation continuous wave signal is first transmitted, and at least one antenna receives a second frequency modulation continuous wave signal resulted by a target reflecting the first frequency modulation continuous wave signal. Multiple motion parameters associated with the target are then obtained according to the first frequency modulation continuous wave signal and the second frequency modulation continuous wave signal. Multiple measured values corresponding to the at least one antenna are obtained according to the motion parameters and configuration parameters of the at least one antenna, respectively. Afterwards, the measured values are substituted into a formula to obtain an estimated angle between a preset direction of the electronic device and the target.

34 Claims, 4 Drawing Sheets

(51) Int. Cl.
  *G01S 13/42* (2006.01)
  *G01S 13/93* (2006.01)

(56) References Cited

U.S. PATENT DOCUMENTS

| | | | |
|---|---|---|---|
| 6,856,280 | B1 | 2/2005 | Eder et al. |
| 6,873,251 | B2 | 3/2005 | Schiffmann et al. |
| 7,567,201 | B2 | 7/2009 | Miyake |
| 7,760,133 | B2 | 7/2010 | Shirai et al. |
| 7,760,134 | B2 | 7/2010 | Morinaga et al. |
| 7,907,083 | B2 | 3/2011 | Sakamoto et al. |
| 2004/0254729 | A1* | 12/2004 | Browne et al. ............... 701/301 |

OTHER PUBLICATIONS

F. Fuyuki et al., "A MUSIC method for the radar that measures the angle of arrival by using a scanning beam radar", Electronics and Communications in Japan, Part 1, vol. 89, No. 10, Oct. 2006, pp. 24-33.

M. Morinaga et al., "DOA estimation of coherent waves for 77GHz automotive radar with three receiving antennas", Proceedings of the 6th European Radar Conference, Sep. 30-Oct. 2, 2009, Rome, Italy, pp. 145-148.

P. Hacker et al., "Single snapshot DOA estimation", Advances in Radio Science, 2010, pp. 251-256.

R. Hermann et al., "Lateral velocity estimation for automotive radar applications", In Proceeding of IET International Conference on Radar Systems, Oct. 2007, pp. 1-4.

Choi et al., "High angular resolution estimation methods for vehicle FMCW radar," Radar (Radar), 2011 IEEE CIE International Conference on, Oct. 24-27, 2011, pp. 1868-1871.

"Office Action of Taiwan Counterpart Application", issued on Apr. 22, 2014, p. 1-p. 4.

* cited by examiner

MOTION PARAMETER ESTIMATING METHOD, ANGLE ESTIMATING METHOD AND DETERMINATION METHOD

CROSS-REFERENCE TO RELATED APPLICATION

This application claims the priority benefit of Taiwan application serial no. 101127474, filed on Jul. 30, 2012. The entirety of the above-mentioned patent application is hereby incorporated by reference herein and made a part of this specification.

BACKGROUND OF THE INVENTION

1. Field of the Invention

The present invention relates to a parameter estimating method, and more particularly, to a method for estimating motion parameters and angle of a target.

2. Description of Related Art

Following the rapid increase of population and gradual recovery of world economy, disposable personal income and consumption power have increased year by year, which, accordingly, has made the world car sales increase continuously. Statistics show that car sales in most countries increase in 2010 and, in particular, car sales in China mainland hit 18.06 million units, which ranks first, followed by the United States and Japan, with 12 million units and 5 million units, respectively.

With the continuous growth in car sales, the car electronics industry has been in vigorous development which covers six major aspects including car safety system, body system, driver information system, suspension & chassis system, engine transmission system, and security system. Among these aspects, the car safety system has the highest compound annual growth rate.

With the number of cars ever-increasing, the possibilities of road traffic accidents also increase. A European study shows that an extra 0.5 second early warning can prevent at least 60% of rear-end collisions, 30% of head-on collisions and 50% of road-related accidents, and 1.5 seconds will prevent 90% of them. Therefore, the car safety system is critically important.

The car safety system can be classified, in terms of function and types, into active and passive types. Prior to year 2000, the passive safety systems, for example, safe belts or various types of air-bags, were mainly used in the market. Following the development of semiconductor technology and advancement of high frequency electronic circuit technology, the active safety systems have been rapidly developed since year 2000. At the same time, people's demand for safety is continuously rising, which transits from the original passive damage reduction to active damage avoidance. During driving on the road, if the active safety systems can provide the early warning function prior to the occurrence of danger, reminding the driver or even actively manipulating the vehicle to avoid danger to thereby provide protection for the drivers, they can play a better role than the passive safety systems.

Accordingly, current active safety systems have undergone a significant development, which dominate the overall car safety system market. The current active safety systems include, for example, adaptive cruise control (ACC), Stop & Go, lane departure warning system, environment recognition, collision avoidance, advanced driver aid system (ADAS). Developments of the active safety systems in the world generally lie in three major aspects: 1. basic collision-avoidance warning technology—adaptive cruise control, rear end collision-avoidance, frontal pedestrian and obstacle detection; 2. advanced collision-avoidance technology—improper lane change avoidance, avoidance of collision-accidents at the crossroad, and vehicle diagnosis; 3. basic driver information equipment—road guide, instant traffic, driver information and navigation.

Current European governments' study plan focuses on the development of driver monitoring system, road condition detection system and smart steering control. US government is cooperating with General Motor to develop and test a rear view collision avoidance system. Japan is conducting a large amount of on-road verification of Smartway, which employs various sub-systems including a forward radar and a lane departure warning indicator to perform various advanced functions such as cruise, collision avoidance and lane tracking that are expected to be widely implemented in year 2015. In addition, Korea has also planned to complete the road vehicle automation before 2020.

The adaptive cruise control (ACC) of the active safety system is developed mainly toward the trend of fixed speed cruise function, the application of which includes high speed, low speed and all-speed cruise control. The principle of the adapted cruise control is that, during a fixed speed cruise of the vehicle, a radar system installed in the front of the vehicle is used to detect the traffic condition in front of the vehicle to maintain a safe distance. When another vehicle enters the lane such that there is not a sufficient safe distance, the vehicle automatically reduces its speed. When there is a sufficient safe distance in front of the vehicle, the vehicle automatically increases its speed back to the driver-set speed. So far, car manufactures, such as NISSAN, BMW, Mercedes Benz, Lexus, Infiniti or the like, have equipped the adaptive cruise control system in their high-level car models. The Stop & Go system is an advanced version of the adaptive cruise control system, the improvement of which is that it can optionally reduce the speed to stop the car rather than shut off the system function at a specific speed. In addition, the Stop & Go system can also automatically accelerate the car to a preset speed and maintain the car distance when the vehicle ahead moves again, and the preset speed can be automatically adjusted according to the traffic, which is suitable for the congested urban roads.

From the above it can be seen that, in the adaptive cruise control and Stop & Go systems, the forefront collision-avoidance radar is a key part. Once the radar misjudges and provides false information, it will cause the entire system to correspondingly generate an incorrect control manner.

However, the signal processing technology of the common adaptive cruise control usually requires high computational load and long observation time to achieve a certain detection accuracy, which makes the practical application of the adaptive cruise control still unsatisfactory.

SUMMARY OF THE INVENTION

Accordingly, the present invention is directed to a motion parameter estimating method, an angle estimating method and a determination method. In the motion parameter estimating method, the corrected formula as mentioned can make the estimated motion parameters match the moving conditions of the target more accurately. In the angle estimating method, an estimated angle between the electronic device and the target can be obtained according to a derived closed-form solution. In addition, the derived closed-form solution can make the operations of the angle estimation have the characteristics of low computational load and high accuracy. In the determination method, whether the estimated angle is reliable can be determined through simple operations.

The present invention provides a motion parameter estimating method adapted for an electronic device. The electronic device includes at least one antenna. In this method, a first frequency modulation continuous wave (FMCW) signal is first transmitted, and each of the at least one antenna receives a second frequency modulation continuous wave signal resulted by a target reflecting the first frequency modulation continuous wave signal. A first formula and a second formula are then obtained according to the second frequency modulation continuous wave signal received by each of the at least one antenna. Afterwards, multiple motion parameters associated with the target are estimated according to the first formula and the second formula. The first formula is $$f_{IF\_up} = \frac{2 \cdot B \cdot R}{c \cdot T_{ramp}} - \frac{2 \cdot f_c \cdot v}{c}$$

and the second formula is $$f_{IF\_dn} = \frac{2 \cdot B \cdot (R + v \cdot T_{ramp})}{c \cdot T_{ramp}} + \frac{2 \cdot f_c \cdot v}{c}$$

where, B is a frequency bandwidth of the first frequency modulation continuous wave signal, R is a relative distance between the electronic device and the target, $f_c$ is a carrier frequency of the first frequency modulation continuous wave signal, v is a relative speed between the electronic device and the target, $T_{ramp}$ is a measuring time associated with the measured values, and c is the speed of light.

The present invention also provides an angle estimating method adapted for an electronic device. The electronic device includes at least one antenna. In this method, a first frequency modulation continuous wave signal is first transmitted, and each of the at least one antenna receives a second frequency modulation continuous wave signal resulted by a target reflecting the first frequency modulation continuous wave signal. Multiple motion parameters associated with the target are then obtained according to the first frequency modulation continuous wave signal and the second frequency modulation continuous wave signal, and multiple measured values corresponding to the at least one antenna are obtained according to the motion parameters and configuration parameters of the at least one antenna, respectively. Afterwards, the measured values are substituted into a formula to obtain an estimated angle between a preset direction of the electronic device and the target. The formula is:

$$\hat{\phi} = -\sin^{-1}\left[\frac{\lambda}{2\pi d} \cdot \frac{\sum_{i=1}^{N-1}\sum_{j=i+1}^{N}(j-i) \cdot ARG(r_i^* \cdot r_j)}{\sum_{i=1}^{N-1}\sum_{j=1}^{N-i} j^2}\right]$$

where, $\hat{\phi}$ is the estimated angle, N is the number of the at least one antenna, d is the spacing between the at least one antenna, $\lambda$ is the wavelength of the first frequency modulation continuous wave signal, $r_i$ is the i-th one of the measured values, $r_j$ is the j-th one of the measured values, $ARG(r_i^* \cdot r_j)$ is the principle argument of the value resulted from the Hermitian operation of $r_i$ and $r_j$.

In one embodiment, the second formula is:

$$f_{IF\_dn} = \frac{2 \cdot B \cdot (R + v \cdot T_{ramp})}{c \cdot T_{ramp}} + \frac{2 \cdot f_c \cdot v}{c}$$

In one embodiment, the second formula is:

$$f_{IF\_dn} = \frac{2 \cdot B \cdot R}{c \cdot T_{ramp}} + \frac{2 \cdot f_c \cdot v}{c}$$

The present invention further provides a determination method adapted for an electronic device. The electronic device includes at least one antenna. In this method, a first frequency modulation continuous wave signal is first transmitted, and each of the at least one antenna receives a second frequency modulation continuous wave signal resulted by a target reflecting the first frequency modulation continuous wave signal. Multiple motion parameters associated with the target are obtained according to the first frequency modulation continuous wave signal and the second frequency modulation continuous wave signal, and multiple measured values corresponding to the at least one antenna are obtained according to the motion parameters and configuration parameters of the at least one antenna, respectively. Afterwards, an estimated angle between a preset direction of the electronic device and the target according to the measured values is obtained according to multiple measured values, and a first filter and a second filter are designed, wherein the first filter has a zero point outside the scope of the field of view of the electronic device, and the second filter has a zero point at the estimated angle. A first calculation value and a second calculation value of the measured values according to the first filter and the second filter are calculated, respectively, and reliability of the estimated angle is determined according to a ratio between the first calculation value and the second calculation value.

In one embodiment, after the step of substituting the measured values into the formula to obtain the estimated angle between the preset direction of the electronic device and the target, the method further includes substituting the estimated angle into a third formula to obtain at least one angle within the scope of a field of view of the electronic device, wherein no corresponding angle effects occur at the at least one angle, and wherein the third formula is:

$$\theta_p = \sin^{-1}\left[\sin(\hat{\phi}) + p \cdot \left(\frac{\lambda}{d}\right)\left(\sum_{i=1}^{N-1}\sum_{j=1}^{N-i} j^2\right)^{-1}\right]$$

where, $$p = \left\{0, \pm 1, \ldots, \pm \prod_{i=1}^{N-1}\left(\left\lfloor\frac{\theta_{FOV}}{\sin^{-1}\left(\frac{\lambda}{2id}\right)}\right\rfloor + 1\right)\right\}$$

where, $\theta_{FOV}$ is the field of view.

In one embodiment, the first frequency modulation continuous wave signal includes a first signal and a second signal, and the second frequency modulation continuous wave signal includes a third signal and a fourth signal. The step of obtaining the first formula and the second formula according to the first frequency modulation continuous wave signal and the second frequency modulation continuous wave signal includes obtaining the first formula according to a relative relationship between the first signal and the third signal and then obtaining the second formula according to a relative relationship between the second signal and the fourth signal.

In one embodiment, the motion parameters include the relative distance and the relative speed.

In one embodiment, the frequency bandwidth is determined based on a measuring distance resolution associated with the relative distance.

In one embodiment, the measuring time is determined based on a measuring speed resolution associated with the relative speed.

In one embodiment, the first calculation value is $\|w_1^H r\|_2^2$, where $w_1$ includes the coefficients of the first filter, r is a vector comprised of the measured values, $(\bullet)^H$ is a Hermitian operator, and $\|\bullet\|_2$ is a 2-norm operator.

In one embodiment, the second calculation value is $\|w_2^H r\|_2^2$, where $w_2$ includes the coefficients of the second filter, r is a vector comprised of the measured values, $(\bullet)^H$ is a Hermitian operator, and $\|\bullet\|_2$ is a 2-norm operator.

In view of the foregoing, embodiments of the present invention provide a motion parameter estimating method, an angle estimating method and a determination method. In the motion parameter estimating method, motion parameters that substantially reflect the actual movement of the target can be obtained according to the first formula and second formula. In the angle estimating method, the estimated angle between the electronic device and the target can be obtained according to the derived closed-form solution. In addition, the closed-form solution has the characteristics of low computational load and high accuracy, which makes the angle estimating method of the embodiments of the present invention more suitable for practical application. On the other hand, after the estimated angle is obtained using the angle estimating method, the determination method can determine whether the estimated angle is reliable.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Descriptions of the invention are given with reference to the exemplary embodiments illustrated with accompanied drawings. In addition, whenever possible, identical or similar reference numbers refer identical or similar elements in the figures and the embodiments.

Figure 1:
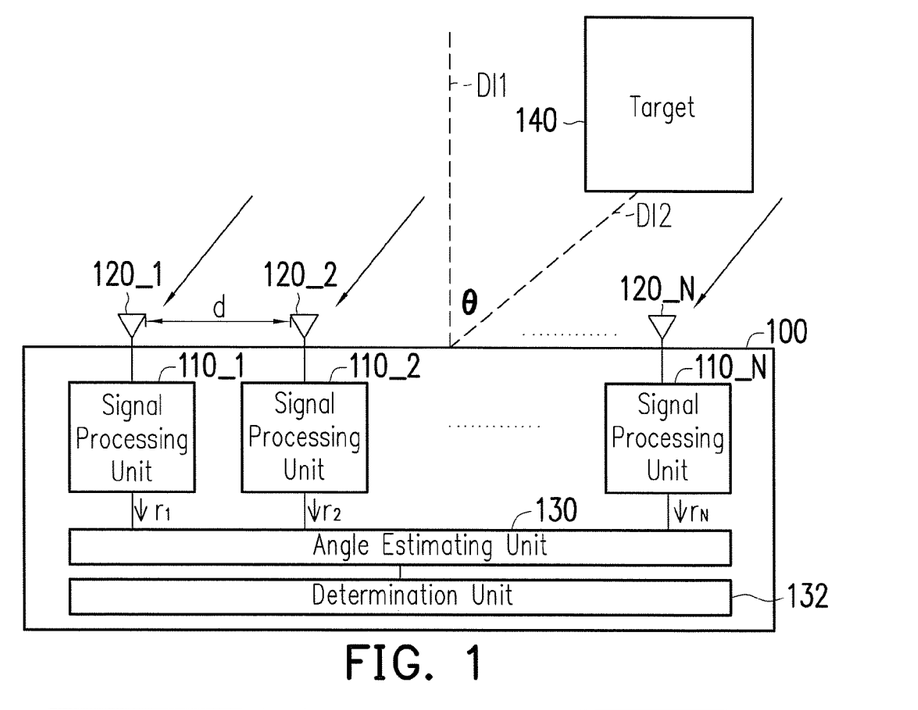
FIG. 1 illustrates a schematic diagram of using an electronic device to estimate motion parameters of a target according to one embodiment of the present invention.

FIG. 1 illustrates a schematic diagram of using an electronic device to estimate motion parameters of a target according to one embodiment of the present invention. In the present embodiment, the electronic device 100 includes signal processing units 110_1 to 110_N (N is a positive integer), antennas 120_1 to 120_N, and an angle estimating unit 130. The antennas 120_1 to 120_N are connected to the angle estimating unit 130 through the signal processing units 110_1 to 110_N, respectively. The signal processing units 110_1 to 110_N may be hardware devices such as communication signal processing chips, processors or computer systems, or software devices with communication signal processing function (e.g., application program capable of communication signal demodulation). In addition, the signal processing units 110_1 to 110_N may be a combination of hardware and software devices. The antennas 120_1 to 120_N may be disposed on the electronic device 100 in an array, with a spacing d between adjacent antennas.

The electronic device 100 can detect motion parameters of the target 140 (e.g., relative speed and relative distance between the target 140 and the electronic device 100) using, for example, an antenna array and wireless communication signal processing technology. For example, the electronic device 100 may transmit a measuring signal through a transmitting antenna (not shown). When the measuring signal contacts an object, such as the target 140, and is reflected, the electronic device 100 can receive the reflected measuring signal through the antennas 120_1 to 120_N, and the motion parameters associated with the target 140 are obtained by the signal processing units 110_1 to 110_N according to characteristics of the signals received by the respective antennas corresponding to the signal processing units.

Figure 2:
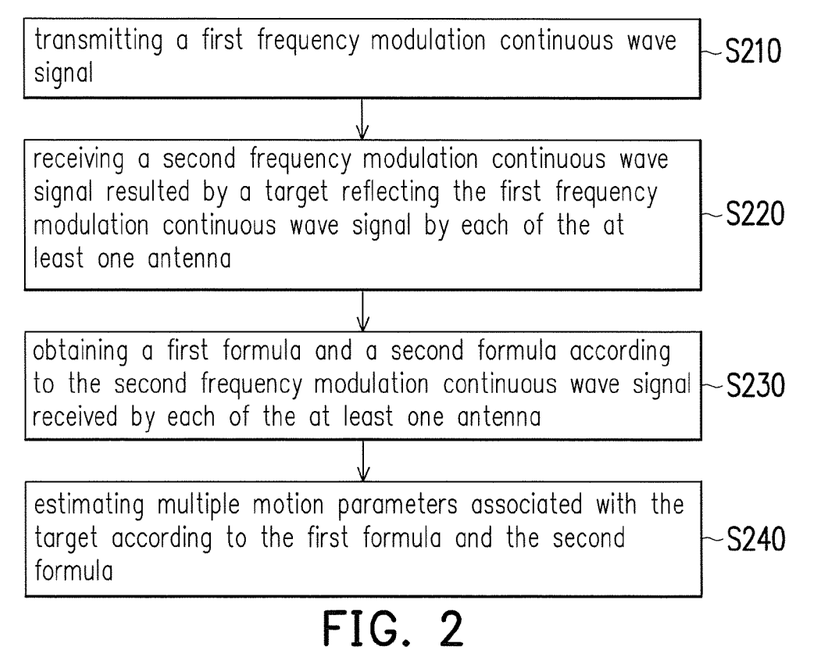
FIG. 2 illustrates a flow chart of a motion parameter estimating method according to one embodiment of the present invention.
Figure 3:
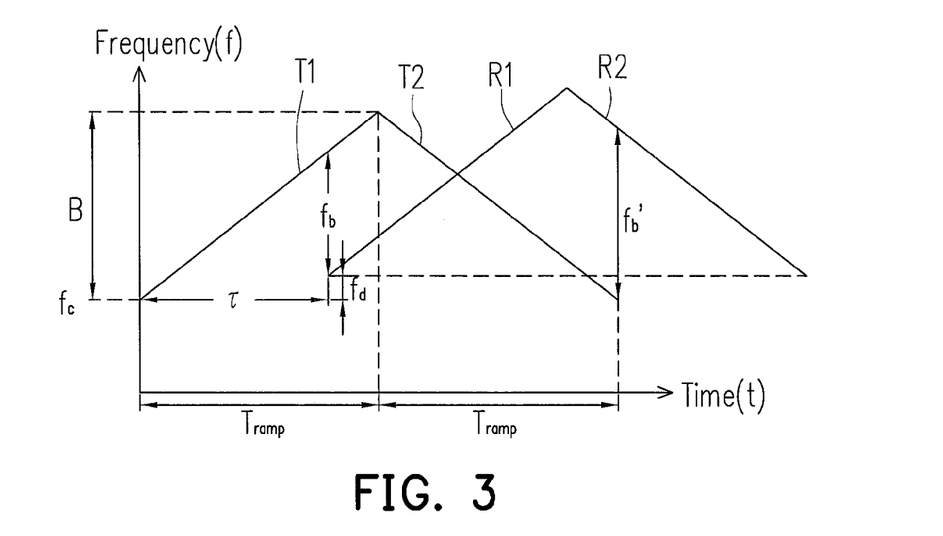
FIG. 3 illustrates a relationship between a first frequency modulation continuous wave signal and a second frequency modulation continuous wave signal according to one embodiment of the present invention.

FIG. 2 illustrates a flow chart of a motion parameter estimating method according to one embodiment of the present invention. FIG. 3 illustrates a relationship between a first frequency modulation continuous wave (FMCW) signal and a second FMCW signal according to one embodiment of the present invention. Referring to FIG. 1, FIG. 2 and FIG. 3, detailed steps of estimating motion parameters of, for example, the target 140 by the electronic device 100 are discussed below in conjunction with the elements of FIG. 1. At step S210, the electronic device 100 transmits the first FMCW signal (i.e., a measuring signal for measuring whether there is another object around the electronic device 100) using, for example, a transmitting antenna.

In one embodiment, the frequency of the first FMCW signal during modulation may vary according to, for example, a first signal T1 shown in FIG. 3. In accordance with various parameters of FIG. 3, the first signal T1 may be expressed as:

$$f_{T1}(t) = f_c + \frac{B}{T_{ramp}} \cdot t, \qquad (1)$$

$$0 < t < T_{ramp}$$

where, frequency bandwidth B is the frequency bandwidth of the first FMCW signal, carrier frequency $f_c$ is the carrier frequency of the first FMCW signal, and measuring time $T_{ramp}$ is the time that the first FMCW signal needs to ramp from the carrier frequency $f_c$ to carrier frequency $(f_c+B)$.

In another embodiment, the frequency bandwidth B may be determined according to the resolution of the measuring distance (e.g., the relative distance between the electronic device 100 and the target 140) to be detected. For example, B=c/(2·ΔR), where c is the speed of light, and ΔR is the resolution of the measuring distance. In addition, the measuring time $T_{ramp}$ may be determined according to the resolution of the measuring speed (e.g., the relative speed between the electronic device 100 and the target 140) to be detected. For example, $T_{ramp}$=c/(2f$_c$Δv), where Δv is the resolution of the measuring speed. In other words, the frequency bandwidth B increases as the measurement of the relative distance is desired to have a higher accuracy; the measuring time $T_{ramp}$ also increases as the measurement of the relative speed is desired to have a higher accuracy.

Then, at step S220, when the first FMCW signal contacts an object, such as the target 140, and is reflected, the electronic device 100 may receive the second FMCW signal (i.e., the reflected first FMCW signal) through the antennas 120_1 to 120_N. The second FMCW signal may propagate in the form of plane waves and, therefore, the second FMCW signal received by each of the antennas 120_1 to 120_N may be essentially different (e.g., in phase or power).

Taking the antenna 120_1 as an example, the frequency variation of the second FMCW signal received by the antenna 120_1 may be, for example, in accordance with the third signal R1 shown in FIG. 3, which, in accordance with various parameters of FIG. 3, may be expressed as:

$$f_{R1}(t) = f_c + \frac{B}{T_{ramp}} \cdot (t - \tau), \quad (2)$$

$$\tau < t < T_{ramp}$$

where, time difference T is the time difference between the time point when the first FMCW signal is transmitted and the time point when the second FMCW signal is received, beat frequency $f_b$ is the frequency difference between the first signal T1 and the third signal R1 at a same time point (i.e., $f_{T1}(t) - f_{R1}(t)$). In addition, when a relative movement exists between the electronic device 100 and the target 140, a Doppler frequency offset due to Doppler effect may exist between the first signal T1 and the third signal R1.

Therefore, at step S230, according to the formula (1) and formula (2), the beat frequency $f_b$ may be expressed as:

$$f_b = f_{T1}(\tau) - f_{R1}(\tau) = \frac{B}{T_{ramp}} \cdot \frac{2R}{c} - \frac{2f_c \cdot v}{c} \quad (3)$$

where, relative distance R is the relative distance between the electronic device 100 and the target 140, relative speed v is the relative speed between the electronic device 100 and the target 140.

Based on the above teachings, people skilled in the art should be able to express the beat frequency $f_b$' as the following formula (4) according to the relationship between the second signal T2 and the fourth signal R2:

$$f_b' = \frac{B}{T_{ramp}} \cdot \frac{2R}{c} + \frac{2f_c \cdot v}{c} \quad (4)$$

In one embodiment, the beat frequency $f_b$ and $f_b$' may be respectively obtained by the signal processing unit 110_1 by frequency-mixing the first FMCW signal and the second FMCW signal corresponding to the signal processing unit 110_1 and passing the frequency-mixed signal through, for example, a low-pass filter (not shown) and a fast Fourier transform unit (not shown). However, the present invention is not intended to be limited to this particular manner.

Therefore, once the beat frequencies $f_b$ and $f_b$' are known, the signal processing unit 110_1 may estimate the relative distance R and relative speed v between the electronic device 100 and the target 140 according to the formula (3) and formula (4).

However, in practice, when measuring time $T_{ramp}$ is a little long, the relative distance R between the electronic device 100 and the object 140 may vary. Therefore, in order for the estimation of the relative distance R and the relative speed v to better reflect the actual movement between the electronic device 100 and the target 140, the formula (4) may be modified as follows in another embodiment:

$$f_b'' = \frac{B}{T_{ramp}} \cdot \frac{2(R + v \cdot T_{ramp})}{c} + \frac{2f_c \cdot v}{c} \quad (5)$$

Then, at step S240, the signal processing unit 110_1 can obtain the relative distance R and the relative speed v between the electronic device 100 and the target 140 (i.e., the motion parameters associated with the target 140) according to the formula (3) and formula (5).

As to antennas 120_2 to 120_N, although the second FMCW signal received by each of the antennas 120_2 to 120_N is different from the second FMCW signal received by the antenna 120_1 (e.g., in phase or power), the second FMCW signal received by the antennas 120_2 to 120_N can each be used to obtain motion parameters associated with the target 140 according to the above teachings.

In another embodiment, when there are multiple targets reflecting the first FMCW signal such that the antennas 120_1 to 120_N each receive multiple second FMCW signals, the signal processing units 120_1 to 120_N can still each obtain the motion parameters associated with the target according to the above teachings. Taking the signal processing unit 110_1 and antenna 120_1 as an example, when the antenna 120_1 receives multiple second FMCW signals corresponding to the multiple targets, the signal processing unit 110_1 may frequency-mix the first FMCW signal and the received multiple second FMCW signals, process the frequency-mixed signal using, for example, a low-pass filter and a fast Fourier transform unit to obtain the beat frequency corresponding to each target, and then proceed with subsequent motion parameter estimation operations.

Figure 4:
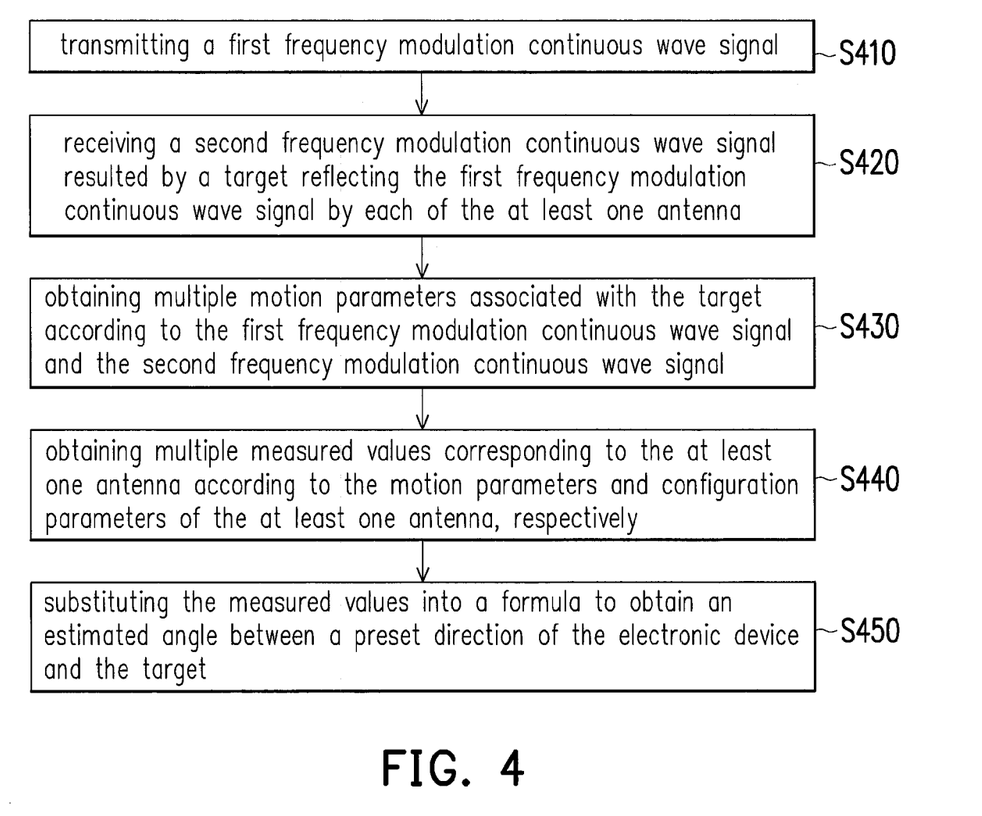
FIG. 4 illustrates a flow chart of an angle estimating method according to one embodiment of the present invention.

FIG. 4 illustrates a flow chart of an angle estimating method according to one embodiment of the present invention. The description of the embodiment of FIG. 2 may be referenced for an understanding of steps S410 to S430 of the present embodiment, which are not repeated herein. It is noted that either formulas (3) and (5) or formulas (3) and (4) can be used in estimating the motion parameters associated with the target 140 (i.e., the relative distance R and relative speed v between the electronic device 100 and the target 140). However, people skilled in the art would appreciate that using the formulas (3) and (5) to calculate the motion parameters associated with the target 140 can result in a higher estimation accuracy because it better reflects the actual situation.

Referring to FIG. 1 and FIG. 4, after step S430, the motion parameters associated with the target 140 (i.e., the relative distance R and the relative speed v between the electronic device 100 and the target 140) can then be obtained. Then, at step S440, the signal processing units 110_1 to 110_N can then obtain corresponding measured values $r_1 \sim r_N$ according to the second FMCW signals received by the respective antennas 120_1 to 120_N and antenna configuration parameters, respectively, where the measured values $r_1 \sim r_N$ may be expressed in vector form as follows:

$$r = \begin{bmatrix} r_1 \\ r_2 \\ \vdots \\ r_N \end{bmatrix} = \alpha \cdot a(\phi) \cdot g(\phi) \cdot s + n \quad (6)$$

where, $\alpha$ is the complex amplitude of the signal received by the antennas 120_1 to 120_N corresponding to the target 140, $\alpha(\phi)$ is the steering vector of the antennas 120_1 to 120_N, $g(\phi)$ is the gain response of the antennas 120_1 to 120_N corresponding to angle $\phi$, s is the signal obtained by demodulating the second FMCW signal received by the antennas 120_1 to 120_N (which is a function of the relative distance R and the relative speed v), and n is a complex white Gaussian noise vector.

Then, in the field of view (FOV) of the electronic device 100, the real angle $\theta$ between a predetermined direction of the electronic device 100 and the target 140 (e.g., the predetermined direction DI1 and DI2) may be estimated using a maximum likelihood estimator. For example, the estimated angle $\hat{\phi}$ for the real angle $\theta$ may be expressed as:

$$\hat{\phi} = \underset{\phi \in FOV}{\operatorname{argmax}}\left[\left|\sum_{i=1}^{N} r_i^* e^{j\frac{2\pi}{\lambda}(i-1)d\sin\phi}\right|^2\right] \quad (7)$$

Where, antenna number N is the number of the antennas 120_1 to 120_N, distance d is the spacing between adjacent antennas 120_1 to 120_N, $\lambda$ is the wavelength of the first FMCW signal, $(\bullet)^H$ is the Hermitian operator. After a number of operations, the formula (7) may be simplified as a closed-form solution as follows:

$$\hat{\phi} = -\sin^{-1}\left[\frac{\lambda}{2\pi d} \cdot \frac{\sum_{i=1}^{N-1}\sum_{j=i+1}^{N}(j-i)\cdot \mathrm{ARG}(r_i^* \cdot r_j)}{\sum_{i=1}^{N-1}\sum_{j=1}^{N-i} j^2}\right] \quad (8)$$

where, $\mathrm{ARG}(r_i^* \cdot r_j)$ is the principle argument of the result of the Hermitian operation of $r_i$ and $r_j$.

At step S450, the angle estimating unit 130 can then substitute the measured values $r_1 \sim r_N$ into the formula (8) to obtain the estimated angle $\hat{\phi}$ between the preset direction DI1 of the electronic device 100 and the target 140.

In another embodiment, because $\mathrm{ARG}(r_i^* \cdot r_j)$ only considers the principle argument, which will result in an incorrect estimated angle $\hat{\phi}$ when there are corresponding angle effects. Accordingly, in order to avoid the incorrect estimated angle $\hat{\phi}$ due to the corresponding angle effects, the field of view $\theta_{FOV}$ of the electronic device 100 needs to satisfy the following inequality:

$$-\frac{\lambda}{2(N-1)d} < \sin(\theta_{FOV}) < \frac{\lambda}{2(N-1)d} \quad (9)$$

In general, a wider field of view $\theta_{FOV}$ represents that the electronic device 100 has a greater observation range. On the other hand, a greater distance d is required for the antennas 120_1 to 120_N to have sufficient antenna gain and low sidelobe. However, there is a tradeoff between the field of view $\theta_{FOV}$ and the distance d, which makes it not easy to satisfy the formula (9). For example, when the antennas 120_1 to 120_N are disposed with a large distance d (i.e., the antennas 120_1 to 120_N occupy a large space), which correspondingly narrows the field of view $\theta_{FOV}$, the observation range of the electronic device 100 will be reduced. Therefore, when the formula (9) is not satisfied, the estimation of the estimated angle $\hat{\phi}$ may be incorrect.

Therefore, in order to obtain the $\mathrm{ARG}(r_i^* \cdot r_j)$ in the event of corresponding angle effects, the estimated angle $\hat{\phi}$ may be substituted into the following formula:

$$\theta_p = \sin^{-1}\left[\sin(\hat{\phi}) + p \cdot \left(\frac{\lambda}{d}\right)\left(\sum_{i=1}^{N-1}\sum_{j=1}^{N-i} j^2\right)^{-1}\right] \quad (10)$$

$$p = \left\{0, \pm 1, \ldots, \pm \prod_{i=1}^{N-1}\left(\left\lfloor \frac{\theta_{FOV}}{\sin^{-1}\left(\frac{\lambda}{2id}\right)}\right\rfloor + 1\right)\right\} \quad (11)$$

where, $\lfloor \bullet \rfloor$ is the Gaussian integer operator. In other words, after any field of view $\theta_{FOV}$ and distance d are determined, the all possible value of the parameter p yielding the estimated angle $\hat{\phi}$ in (8) can be fully obtained according to (11). Then, the estimated angle $\hat{\phi}$ and the all possible values of the parameter p are then sequentially substituted into formula (10) to obtain a complete set of the angle $\theta_p$. Next, each value within the complete set of the angle $\theta_p$ may be respectively substituted into $$\hat{\phi}' = \underset{\phi \in \{\theta_p\}}{\operatorname{argmax}}\left[\left|\sum_{i=1}^{N} r_i^* e^{j\frac{2\pi}{\lambda}(i-1)d\sin\phi}\right|^2\right] \quad (12)$$

for finding the actual solution of the real angle $\theta$ between the electronic apparatus 100 and the target 140. Specifically, the angle yielding the maximum value of the objective function in formula (12) is the actual ML solution. By doing so, the correct target angle information can be determined using (12) without any ambiguity.

Therefore, after the angle $\theta_p$ at which no corresponding angle effects occur is found according to formulas (10) and (11), the correct estimated angle $\hat{\phi}'$ can be obtained according to formula (12).

Taking N=3 for example, formula (8) can be converted as follows:

$$\hat{\phi} = -\sin^{-1}\left[\frac{\lambda}{3\pi d} \cdot \frac{\mathrm{ARG}(r_1^* \cdot r_2) + 2 \cdot \mathrm{ARG}(r_1^* \cdot r_3) + \mathrm{ARG}(r_2^* \cdot r_3)}{4}\right] \quad (13)$$

However, operation of $\mathrm{ARG}(r_i^* \cdot r_j)$ may have the issue of corresponding angle effects. In this case, the angle $\theta_p$ at which no corresponding angle effects occur can be found from the scope of the field of view $\theta_{FOV}$ according to formulas (10), i.e., $$\theta_p = \sin^{-1}\left[\sin(\hat{\phi}) + 2\pi p \cdot \left(\frac{\lambda}{12\pi d}\right)\right] \quad (14)$$

where, $$p = \left\{0, \pm 1, \ldots, \pm \left(\left\lfloor \frac{\theta_{FOV}}{\sin^{-1}\left(\frac{\lambda}{2d}\right)}\right\rfloor + 1\right)\left(\left\lfloor \frac{\theta_{FOV}}{\sin^{-1}\left(\frac{\lambda}{4d}\right)}\right\rfloor + 1\right)\right\} \quad (15)$$

Afterwards, the angle $\theta_p$ obtained according to formula (14) is substituted into formula (12), which can result in the corresponding estimated angle $\hat{\phi}'$.

Figure 5:
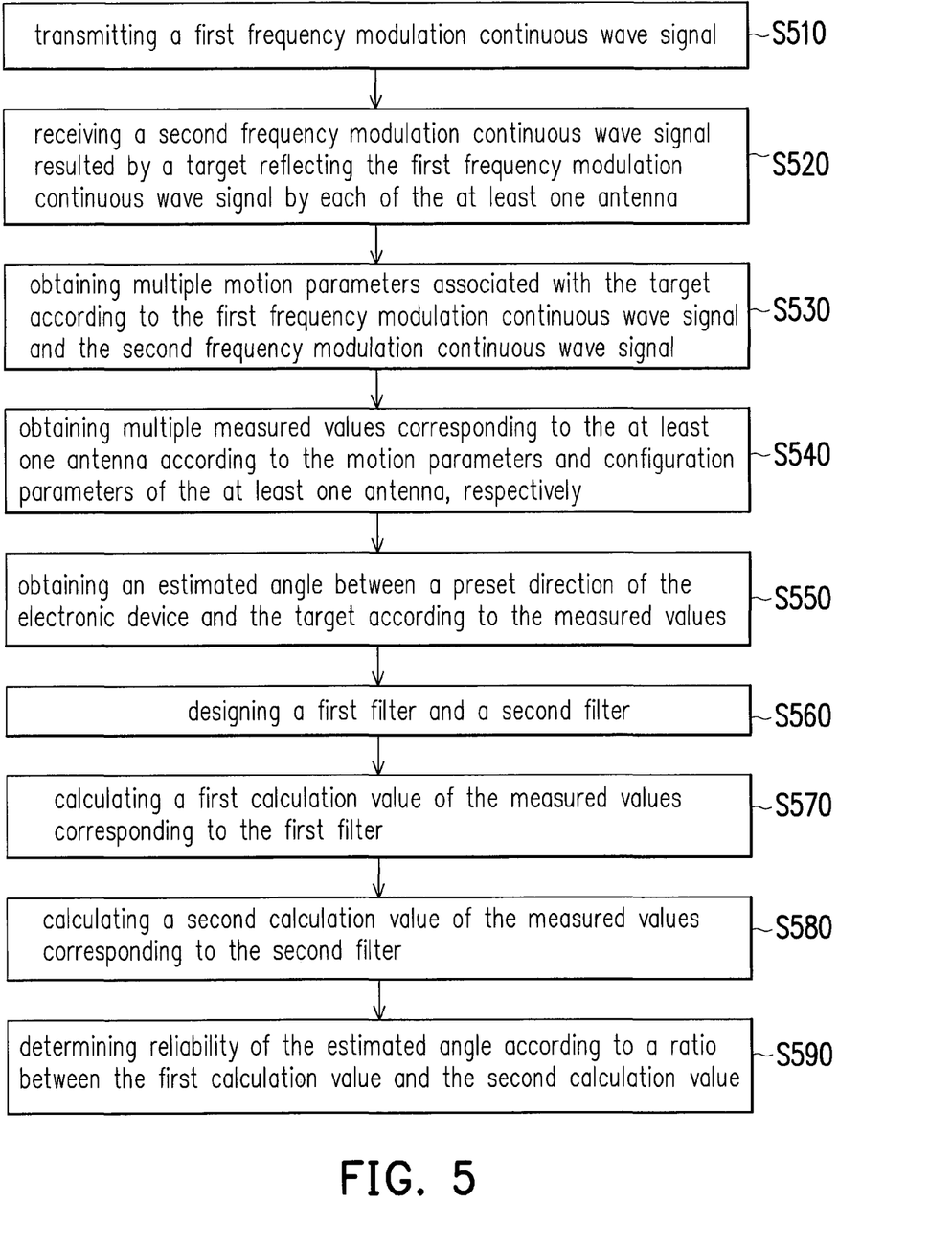
FIG. 5 illustrates a flow chart of a determination method according to one embodiment of the present invention.

FIG. 5 illustrates a flow chart of a determination method according to one embodiment of the present invention. Referring to FIG. 1 and FIG. 5, the description of the embodiment of FIG. 2 and FIG. 4 may be referenced for an understanding of steps S510 to S550 of the present embodiment, which is not repeated herein. In addition, the electronic device 100 may further include a determination unit 132 for determining whether the estimated angle $\hat{\phi}'$ is reliable.

For example, if, when the electronic device 100 is estimating motion parameters of, for example, the target 140, there is another target (not shown) appearing within the field of view $\theta_{FOV}$ of the electronic device 100, which is moving at a relative distance R and a relative speed v, this may cause the estimated angle $\hat{\phi}'$ to be unreliable. In this case, after obtaining, for example, the measured values $r_1 \sim r_N$ and estimated angle $\hat{\phi}'$ through step S550, at step S560, a first filter and a second filter may be designed in the determination unit 132 and whether the estimated angle $\hat{\phi}'$ is reliable can be determined according to the relationship between the outputs of the first filter and the second filter and the measured values $r_1 \sim r_N$. For example, a zero point of the first filter may be designed to be outside the field of view $\theta_{FOV}$, while the zero point of the second filter may be designed to be approximately at the estimated angle $\hat{\phi}'$.

At step S570, the determination unit 132 may calculate a first calculation value $P_1$ according to, for example, a first filter coefficient $w_1$ and the measured values $r_1 \sim r_N$. At step S580, the determination unit 132 may calculate a second calculation value $P_2$ according to, for example, a second filter coefficient $w_2$ and the measured values $r_1 \sim r_N$.

At step S590, the determination unit 132 may calculate a ratio P between the first calculation value $P_1$ and the second calculation value $P_2$ and determine the reliability of the estimated angle $\hat{\phi}'$ according to the calculated ratio P.

In one embodiment, the ratio P may be obtained according to, for example, the following formula (16):

$$P = \frac{P_2}{P_1} = \frac{\|w_2^H r\|_2^2}{\|w_1^H r\|_2^2} \quad (16)$$

where, $\|\bullet\|_2$ is 2-norm operator. In this case, if the estimated angle $\hat{\phi}'$ is reliable, the second calculation value $P_2$ should be small because the second filter has filtered a large part of the power of the measured values $r_1 \sim r_N$. Therefore, when the ratio P is higher than a preset threshold, the determination unit 132 can then recognize that the measured values $r_1 \sim r_N$ are made up by signals reflected by multiple targets (having the same relative distance R and the same relative speed with respect to the electronic device 100) and thereby determine that the estimated angle $\hat{\phi}'$ is unreliable. In another embodiment, the preset threshold can be inferred according to, for example, Bayesian law, under the condition of a predetermined false alarm rate. However, this should not be regarded as limiting.

Figure 6:
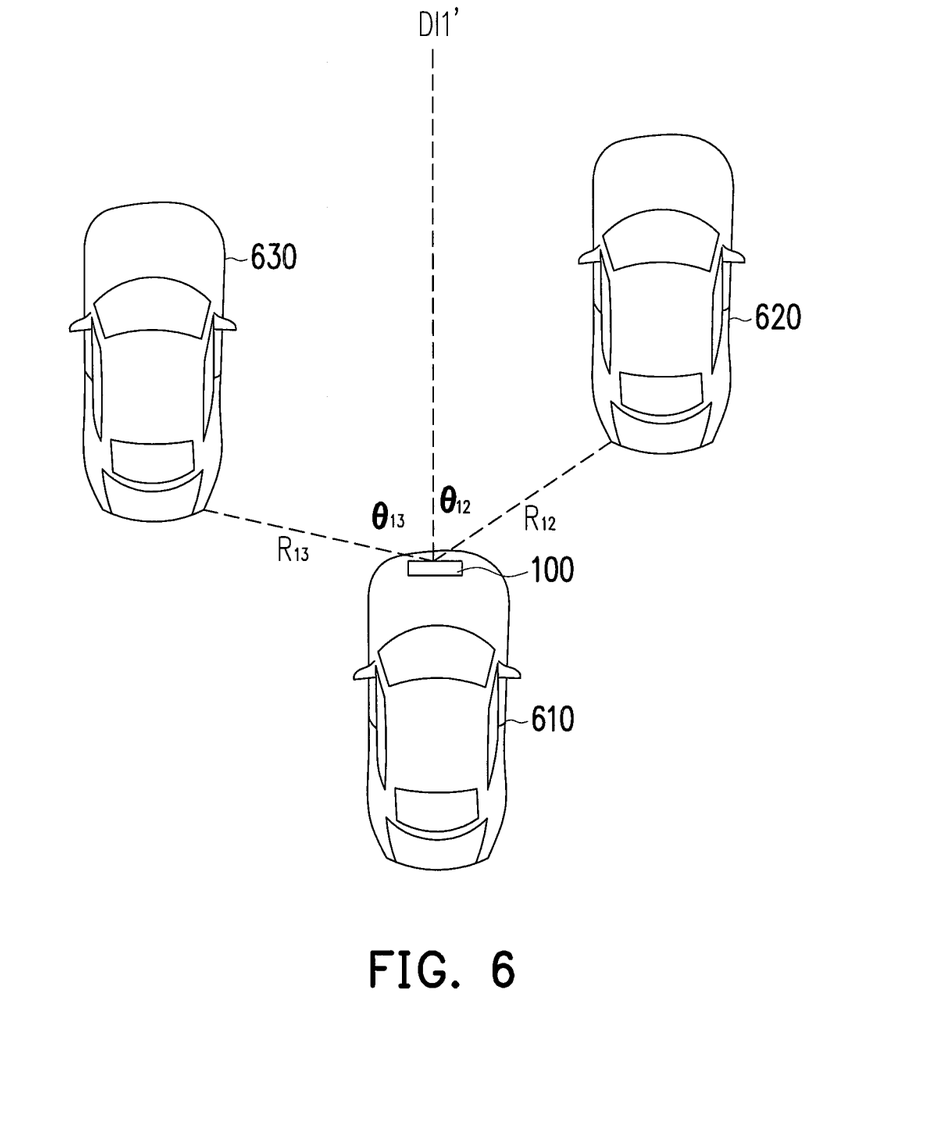
FIG. 6 illustrates a schematic diagram of using the electronic device to estimate relative motion parameters and angles between vehicles according to one embodiment of the present invention.

FIG. 6 illustrates a schematic diagram of using the electronic device to estimate relative motion parameters and angles between vehicles according to one embodiment of the present invention. In the present embodiment, the electronic device 100 may be installed, for example, at a front end of a vehicle 610. However, this should not be regarded as limiting. The electronic device 100 may use the method of the embodiment of FIG. 2 to measure the relative distance $R_{12}$ between the vehicles 610 and 620 and the relative distance $R_{13}$ between the vehicles 610 and 630 at the same time. In addition, the electronic device 100 may also use the method of the embodiment of FIG. 4 to estimate the angle $\theta_{12}$ between, for example, a preset direction DI1' and the vehicle 620 and the angle $\theta_{13}$ between, for example, the preset direction DI1' and the vehicle 620, at the same time.

In summary, embodiments of the present invention provide a motion parameter estimating method, an angle estimating method and a determination method. In the motion parameter estimating method, motion parameters that reflect the actual movement of the target can be obtained according to the first formula and second formula. In the angle estimating method, the estimated angle between the electronic device and the target can be obtained according to the derived closed-form solution. In addition, the closed-form solution has the characteristics of low computational load and high accuracy, which makes the angle estimating method of the embodiments of the present invention more suitable for practical application. On the other hand, after the estimated angle is obtained using the angle estimating method, the determination method can determine whether the estimated angle is reliable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motion parameter estimating method adapted for a car safety system, the car safety system comprising at least one antenna being arranged as an array, a transmitting antenna and a processor, the method comprising:

transmitting, by the transmitting antenna, a first frequency modulation continuous wave signal;

receiving, by each of the at least one antenna being arranged as the array, a second frequency modulation continuous wave signal resulted by a target reflecting the first frequency modulation continuous wave signal;

obtaining, by the processor, a first formula and a second formula according to the second frequency modulation continuous wave signal received by each of the at least one antenna; and estimating, by the processor, multiple motion parameters associated with the target according to the first formula and the second formula, wherein the first formula is $$f_{IF\_up} = \frac{2 \cdot B \cdot R}{c \cdot T_{ramp}} - \frac{2 \cdot f_c \cdot v}{c},$$

and the second formula is $$f_{IF\_dn} = \frac{2 \cdot B \cdot (R + v \cdot T_{ramp})}{c \cdot T_{ramp}} + \frac{2 \cdot f_c \cdot v}{c},$$

where, B is a frequency bandwidth of the first frequency modulation continuous wave signal, R is a relative distance between the car safety system and the target, $f_c$ is a carrier frequency of the first frequency modulation continuous wave signal, v is a relative speed between the car safety system and the target, $T_{ramp}$ is a measuring time associated with the measured values, and c is the speed of light.

2. The motion parameter estimating method according to claim 1, wherein the first frequency modulation continuous wave signal comprises a first signal and a second signal, the second frequency modulation continuous wave signal comprises a third signal and a fourth signal, and the step of obtaining the first formula and the second formula according to the first frequency modulation continuous wave signal and the second frequency modulation continuous wave signal comprises:
   obtaining, by the processor, the first formula according to a relationship between the first signal and the third signal; and
   obtaining, by the processor, the second formula according to a relationship between the second signal and the fourth signal.

3. The motion parameter estimating method according to claim 1, wherein the motion parameters comprise the relative distance and the relative speed.

4. The motion parameter estimating method according to claim 1, wherein the frequency bandwidth is determined based on a measuring distance resolution associated with the relative distance.

5. The motion parameter estimating method according to claim 1, wherein the measuring time is determined based on a measuring speed resolution associated with the relative speed.

6. The motion parameter estimating method according to claim 1, wherein the car safety system further comprising an angle estimating unit, and after the step of estimating the motion parameters associated with the target according to the first formula and the second formula, the method further comprises:
   obtaining, by the processor, multiple measured values corresponding to the at least one antenna according to the motion parameters and configuration parameters of the at least one antenna, respectively;
   obtaining, by the angle estimating unit, a principle argument between any two of the measured values; and
   estimating, by the angle estimating unit, an estimated angle between a preset direction of the car safety system and the target according to a linear combination of the principle argument between any two of the measured values.

7. The motion parameter estimating method according to claim 6, wherein, after the step of estimating the estimated angle between the preset direction of the car safety system and the target according to the linear combination of the principle argument between any two of the measured values, the method further comprises:
   obtaining, by the angle estimating unit, a parameter yielding the estimated angle to consider a corresponding angle effect; and
   estimating, by the angle estimating unit, a set of the estimated angle under the influence of the corresponding angle effect to obtain at least one angle within the scope of a field of view according to the parameter.

8. The motion parameter estimating method according to claim 6, wherein the car safety system further comprising a determination unit, after the step of estimating the estimated angle between the preset direction of the car safety system and the target according to the linear combination of the principle argument between any two of the measured values, the method further comprises:
   designing, by the determination unit, a first filter with a zero point outside the scope of the field of view of the car safety system;
   designing, by the determination unit, a second filter with a zero point at the estimated angle;
   calculating, by the determination unit, a first calculation value of the measured values corresponding to the first filter;
   calculating, by the determination unit, a second calculation value of the measured values corresponding to the second filter; and
   determining, by the determination unit, reliability of the estimated angle according to a ratio between the first calculation value and the second calculation value.

9. The motion parameter estimating method according to claim 8, wherein the first calculation value is $\|w_1^H r\|_2^2$, where $w_1$ comprises the coefficients of the first filter, r is a vector comprised of the measured values, $(\bullet)^H$ is a Hermitian operator, and $\|\bullet\|_2$ is a 2-norm operator.

10. The motion parameter estimating method according to claim 8, wherein the second calculation value is $\|w_2^H r\|_2^2$, where $w_2$ comprises the coefficients of the second filter, r is a vector comprised of the measured values, $(\bullet)^H$ is a Hermitian operator, and $\|\bullet\|_2$ is a 2-norm operator.

11. An angle estimating method adapted for a car safety system, the car safety system comprising at least one antenna being arranged as an array, a transmitting antenna, a processor and an angle estimating unit, the method comprising:
   transmitting, by the transmitting antenna, a first frequency modulation continuous wave signal;
   receiving, by each of the at least one antenna being arranged as the array, a second frequency modulation continuous wave signal resulted by a target reflecting the first frequency modulation continuous wave signal;
   obtaining, by the processor, multiple motion parameters associated with the target according to the first frequency modulation continuous wave signal and the second frequency modulation continuous wave signal;
   obtaining, by the processor, multiple measured values corresponding to the at least one antenna according to the motion parameters and configuration parameters of the at least one antenna, respectively;
   obtaining, by the angle estimating unit, a principle argument between any two of the measured values; and
   estimating, by the angle estimating unit, an estimated angle between a preset direction of the car safety system and the target according to a linear combination of the principle argument between any two of the measured values.

12. The angle estimating method according to claim 11, wherein the step of obtaining multiple motion parameters associated with the target according to the first frequency modulation continuous wave signal and the second frequency modulation continuous wave signal comprises:

obtaining, by the processor, a first formula and a second formula according to the second frequency modulation continuous wave signal received by each of the at least one antenna; and estimating, by the processor, the multiple motion parameters associated with the target according to the first formula and the second formula, wherein the first formula is $$f_{IF\_up} = \frac{2 \cdot B \cdot R}{c \cdot T_{ramp}} - \frac{2 \cdot f_c \cdot v}{c},$$

where, B is a frequency bandwidth of the first frequency modulation continuous wave signal, R is a relative distance between the car safety system and the target, $f_c$ is a carrier frequency of the first frequency modulation continuous wave signal, v is a relative speed between the car safety system and the target, $T_{ramp}$ is a measuring time associated with the measured values, and c is the speed of light.

13. The angle estimating method according to claim 12, wherein the first frequency modulation continuous wave signal comprises a first signal and a second signal, the second frequency modulation continuous wave signal comprises a third signal and a fourth signal, and the step of obtaining the first formula and the second formula according to the first frequency modulation continuous wave signal and the second frequency modulation continuous wave signal comprises:

obtaining, by the processor, the first formula according to a relationship between the first signal and the third signal; and obtaining, by the processor, the second formula according to a relationship between the second signal and the fourth signal.

14. The angle estimating method according to claim 12, wherein the second formula is:

$$f_{IF\_dn} = \frac{2 \cdot B \cdot (R + v \cdot T_{ramp})}{c \cdot T_{ramp}} + \frac{2 \cdot f_c \cdot v}{c}.$$

15. The angle estimating method according to claim 12, wherein the second formula is:

$$f_{IF\_dn} = \frac{2 \cdot B \cdot R}{c \cdot T_{ramp}} + \frac{2 \cdot f_c \cdot v}{c}.$$

16. The angle estimating method according to claim 12, wherein the motion parameters comprise the relative distance and the relative speed.

17. The angle estimating method according to claim 12, wherein the frequency bandwidth is determined based on a measuring distance resolution associated with the relative distance.

18. The angle estimating method according to claim 12, wherein the measuring time is determined based on a measuring speed resolution associated with the relative speed.

19. The angle estimating method according to claim 11, wherein, after the step of estimating the estimated angle between the preset direction of the car safety system and the target according to the linear combination of the principle argument between any two of the measured values, the method further comprises:

obtaining, by the angle estimating unit, a parameter yielding the estimated angle to consider a corresponding angle effect; and estimating, by the angle estimating unit, a set of the estimated angle under the influence of the corresponding angle effect to obtain at least one angle within the scope of a field of view according to the parameter.

20. The angle estimating method according to claim 11, wherein the car safety system further comprising a determination unit, after the step of estimating the estimated angle between the preset direction of the car safety system and the target according to the linear combination of the principle argument between any two of the measured values, the method further comprises:

designing, by the determination unit, a first filter with a zero point outside the scope of the field of view of the car safety system;

designing, by the determination unit, a second filter with a zero point at the estimated angle;

calculating, by the determination unit, a first calculation value of the measured values corresponding to the first filter;

calculating, by the determination unit, a second calculation value of the measured values corresponding to the second filter; and determining, by the determination unit, a reliability of the estimated angle according to a ratio between the first calculation value and the second calculation value.

21. The angle estimating method according to claim 20, wherein the first calculation value is $\|w_1^H r\|_2^2$, where $w_1$ comprises the coefficients of the first filter, r is a vector comprised of the measured values, $(\bullet)^H$ is a Hermitian operator, and $\|\bullet\|_2$ is a 2-norm operator.

22. The angle estimating method according to claim 20, wherein the second calculation value is $\|w_2^H r\|_2^2$, where $w_2$ comprises the coefficients of the second filter, r is a vector comprised of the measured values, $(\bullet)^H$ is a Hermitian operator, and $\|\bullet\|_2$ is a 2-norm operator.

23. A determination method adapted for a car safety system, the car safety system comprising at least one antenna being arranged as an array, a transmitting antenna, a processor, an angle estimating unit and a determination unit, the method comprising:

transmitting, by the transmitting antenna, a first frequency modulation continuous wave signal;

receiving, by each of the at least one antenna being arranged as the array, a second frequency modulation continuous wave signal resulted by a target reflecting the first frequency modulation continuous wave signal;

obtaining, by the processor, multiple motion parameters associated with the target according to the first frequency modulation continuous wave signal and the second frequency modulation continuous wave signal;

obtaining, by the processor, multiple measured values corresponding to the at least one antenna according to the motion parameters and configuration parameters of the at least one antenna, respectively; and estimating, by the angle estimating unit, an estimated angle between a preset direction of the car safety system and the target according to the measured values;

designing, by the determination unit, a first filter with a zero point outside the scope of the field of view of the car safety system;

designing, by the determination unit, a second filter with a zero point at the estimated angle;

calculating, by the determination unit, a first calculation value of the measured values corresponding to the first filter;

calculating, by the determination unit, a second calculation value of the measured values corresponding to the second filter; and determining, by the determination unit, a reliability of the estimated angle according to a ratio between the first calculation value and the second calculation value.

24. The determination method according to claim 23, wherein the first calculation value is $\|w_1^H r\|_2^2$, where $w_1$ comprises the coefficients of the first filter, r is a vector comprised of the measured values, $(\bullet)^H$ is a Hermitian operator, and $\|\bullet\|_2$ is a 2-norm operator.

25. The determination method according to claim 23, wherein the second calculation value is $\|w_2^H r\|_2^2$, where $w_2$ comprises the coefficients of the second filter, r is a vector comprised of the measured values, $(\bullet)^H$ is a Hermitian operator, and $\|\bullet\|_2$ is a 2-norm operator.

26. The determination method according to claim 23, wherein the step of obtaining the multiple motion parameters associated with the target according to the first frequency modulation continuous wave signal and the second frequency modulation continuous wave signal comprises:

obtaining, by the processor, a first formula and a second formula according to the second frequency modulation continuous wave signal received by each of the at least one antenna; and estimating, by the processor, the multiple motion parameters associated with the target according to the first formula and the second formula, wherein the first formula is $$f_{IF\_up} = \frac{2 \cdot B \cdot R}{c \cdot T_{ramp}} - \frac{2 \cdot f_c \cdot v}{c}$$

where, B is a frequency bandwidth of the first frequency modulation continuous wave signal, R is a relative distance between the car safety system and the target, $f_c$ is a carrier frequency of the first frequency modulation continuous wave signal, v is a relative speed between the car safety system and the target, $T_{ramp}$ is a measuring time associated with the measured values, and c is the speed of light.

27. The determination method according to claim 26, wherein the first frequency modulation continuous wave signal comprises a first signal and a second signal, the second frequency modulation continuous wave signal comprises a third signal and a fourth signal, and the step of obtaining the first formula and the second formula according to the first frequency modulation continuous wave signal and the second frequency modulation continuous wave signal comprises:

obtaining, by the processor, the first formula according to a relationship between the first signal and the third signal; and obtaining, by the processor, the second formula according to a relationship between the second signal and the fourth signal.

28. The determination method according to claim 26, wherein the second formula is $$f_{IF\_dn} = \frac{2 \cdot B \cdot (R + v \cdot T_{ramp})}{c \cdot T_{ramp}} + \frac{2 \cdot f_c \cdot v}{c}.$$

29. The determination method according to claim 26, wherein the second formula is:

$$f_{IF\_dn} = \frac{2 \cdot B \cdot R}{c \cdot T_{ramp}} + \frac{2 \cdot f_c \cdot v}{c}.$$

30. The determination method according to claim 26, wherein the motion parameters comprise the relative distance and the relative speed.

31. The determination method according to claim 26, wherein the frequency bandwidth is determined based on a measuring distance resolution associated with the relative distance.

32. The determination method according to claim 26, wherein the measuring time is determined based on a measuring speed resolution associated with the relative speed.

33. The determination method according to claim 23, wherein the step of obtaining the estimated angle between a preset direction of the car safety system and the target according to the measured values comprises:

obtaining, by the angle estimating unit, a principle argument between any two of the measured values; and estimating, by the angle estimating unit, an estimated angle between a preset direction of the car safety system and the target according to a linear combination of the principle argument between any two of the measured values.

34. The determination method according to claim 33, wherein, after the step of estimating the estimated angle between the preset direction of the car safety system and the target according to the linear combination of the principle argument between any two of the measured values, the method further comprises:

obtaining, by the angle estimating unit, a parameter yielding the estimated angle to consider a corresponding angle effect; and estimating, by the angle estimating unit, a set of the estimated angle under the influence of the corresponding angle effect to obtain at least one angle within the scope of a field of view according to the parameter.

* * * * *